(12) United States Patent
Santina (10) Patent No.: US 11,230,753 B1
(45) Date of Patent: *Jan. 25, 2022

(54) METHOD FOR EXTRACTING RARE EARTH METALS

(71) Applicant: Peter F. Santina, Lincoln, CA (US)

(72) Inventor: Peter F. Santina, Lincoln, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,397

(22) Filed: May 10, 2021

Related U.S. Application Data (63) Continuation of application No. 17/211,730, filed on Mar. 24, 2021.

(60) Provisional application No. 63/047,830, filed on Jul. 2, 2020, provisional application No. 62/994,214, filed on Mar. 24, 2020.

(51) Int. Cl.
*C22B 59/00* (2006.01)
*C22B 7/00* (2006.01)
*C22B 3/06* (2006.01)

(52) U.S. Cl.
CPC ............... *C22B 59/00* (2013.01); *C22B 3/06* (2013.01); *C22B 7/007* (2013.01)

(58) Field of Classification Search
CPC . C22B 59/00; C22B 3/06; C22B 7/007; C02F 1/281; C02F 2101/203
USPC ........................................................ 75/712
See application file for complete search history.

(56) References Cited

U.S. PATENT DOCUMENTS

| | | | |
|---|---|---|---|
| 1,005,963 A | 10/1911 | Groat | |
| 9,272,934 B2 | 3/2016 | Santina | |
| 9,427,706 B1 | 8/2016 | Santina | |
| 9,878,922 B1 | 1/2018 | Santina | |
| 2003/0196961 A1* | 10/2003 | Santina | ................... C02F 1/58 210/679 |

OTHER PUBLICATIONS

Verplanck, Philip L. et al., "Overview of Rare Earth Element Investigations in Acid Waters of U.S. Geological Survey Abandoned Mine Lands Watersheds", U.S. Geological Survey, Boulder, Colorado, Jan. 1999, 10 pgs.
Pereao, Omoniyi et al., "Rare Earth Elements Removal Techniques from Water/Wastewater: A Review", published in Desalination and Water Treatment, Oct. 2018, 16 pgs.

* cited by examiner

*Primary Examiner* — Melissa S Swain
(74) *Attorney, Agent, or Firm* — Thomas M. Freiburger (57) ABSTRACT

Overburden from surface coal mining in many regions can produce a rain runoff laden with selenium, in the selenate form, as well as rare earth elements (REEs). This occurs from rainwater leaching through exposed selenium/mineral-containing rocks in the overburden. The mineral-containing runoff water is caught in ponds, or deep mine water is collected from pools. Alternatively, leachate can be collected from coal gob or refuse piles. Extraction of REEs, as well as remediation of deleterious substances such as selenium, is performed by treatment with sulfur-modified iron (SMI) in a contact bed of an upflow reactor vessel. After a period of use of the SMI, the spent SMI is subjected to a recovery process for REEs.

20 Claims, 6 Drawing Sheets

METHOD FOR EXTRACTING RARE EARTH METALS

BACKGROUND AND SUMMARY OF THE INVENTION

This application is a continuation of application Ser. No. 17/211,730, filed Mar. 24, 2021, which claimed benefit of provisional patent application Ser. Nos. 62/994,214, filed Mar. 24, 2020, and 63/047,830, filed Jul. 2, 2020.

BACKGROUND AND SUMMARY OF THE INVENTION

This application claims benefit of provisional patent application Ser. Nos. 62/994,214, filed Mar. 24, 2020, and 63/047,830, filed Jul. 2, 2020.

The invention concerns recovery of rare earth elements and creating a new source of rare earth minerals. In particular, the invention involves recovery of REEs from wastewater, particularly acid mine water, or leachate from coal ash piles or coal refuse or gob piles, or water from pools in deep mines or from coal ash ponds or from other mining operations, using Sulfur Modified Iron (SMI). The invention also encompasses removal of contaminants from water using SMI, wherein REEs are removed as a byproduct.

Sulfur Modified Iron has been used for some years to remove metal contaminants from water. Sometimes the contaminated water is in groundwater, sometimes in drainage ponds, sometimes in leachate, sometimes in industrial process water. The contaminants have included selenium, nitrates, chromium, cadmium and arsenic and compounds of these substances. The contaminant metals are adsorbed and/or absorbed (chemisorbed) by the SMI and fixed to the SMI. SMI is effective in removing small (low level) concentrations of these metal contaminants from water, often to a level below detectable limits. Normally the SMI with contaminants fixed to the particles is disposed of safely without risk that the contaminants will be released back into the environment.

Rare earth metals if present in the water are also adsorbed/absorbed (chemisorbed) to the SMI and fix (bind) to the SMI particles. Rare earth metals found in low concentrations in water include cerium (Ce), dysprosium (Dy), erbium (Er), europium (Eu) gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The water may have picked up the rare earth metals by leaching through rock at a mining site or at other locations, such as coal ash piles, coal ash ponds, gob piles or refuse piles from deep mining.

The REEs are identified as rare because it is unusual to find them in large concentrations; they are not actually rare. Conventional rare-earth recovery methods require an expensive, difficult and messy extraction process that generates large volumes of contaminated waste. The conventional mining and extraction processes require mining ore from mineral deposits in rock, which is crushed into a powder, dissolved in powerful chemical solutions and filtered. The process is repeated multiple times to retrieve rare earth oxides. Additional processing and refining separates the oxides from their tight bonds and further groups them into light rare earths and heavy rare earths.

In usable form, these elements are necessary components of many modern technologies. Many of them are used in cellular phones, computers, televisions, magnets, batteries, catalytic converters, defense applications and many more segments of modern society.

As an example, acid mine drainage from abandoned mines, or active mines, is one of the biggest industrial pollution sources in Appalachian streams. SMI has been used effectively to remove contaminants from these sources. While reducing unwanted contaminants, the SMI also adsorbs/absorbs and fixes to the SMI rare earth metals that may be present in this water. The SMI concentrates these rare earth metals while cleaning millions of gallons of mine drainage, so that the rare earth metals can be cost-effectively extracted. Coal and the water coming from coal mines can contain all 17 of the rare earth elements, with a substantial amount of the heavy rare earths that are particularly valuable.

Pursuant to the invention, water expected to contain rare earth metals is collected at a site, illustrated herein with a coal mining site, either a surface mine or a deep mine. Such sites will also typically contain selenium, in various oxidated compounds, as discussed in the applicant's U.S. Pat. Nos. 9,272,934, 9,427,706, 9,878,922 and 10,059,613.

In one aspect of the process of the invention, the REE-containing runoff water at a surface coal mining site is caught in detention ponds. In the above-cited patents remediation of the pond water to remove selenate down to permissible levels for discharge to lakes and streams was performed by treatment with Sulfur-Modified Iron (SMI) in an upflow reactor vessel. The SMI will also contain REEs, which will be a by-product of essentially the same process. In some instances the REEs can be the primary product of the SMI process.

After a prefiltering step to remove suspended and colloidal solids, the runoff or pond water is pH-adjusted as needed and pumped through the SMI reactor in upward flow, for a specified detention time in the SMI. The treated water can then be run through an oxidation tank and filtered to remove dissolved iron that is a residual from the SMI process. The process preferably is run in continuous flow.

After a period in which the SMI becomes essentially saturated and less effective and no longer removes appreciable amounts of the contaminant and/or REEs, the spent SMI is removed and processed to separate out rare earth metals, which can be done using existing extracting technologies.

As in the previous patents, the system preferably includes provision for "fluffing" the SMI medium periodically, to expand the bed of SMI with a rapid flow of water through the medium. Not a backflush, this fluffing opens up the spaces between SMI particles, reversing compacting that has occurred, and refreshes the active surfaces to extend the life of the bed. This can be done once or more per day, for about ten to twenty minutes, at, for example, about ten times normal (service) flow rate. Fluff flow is in the same upflow direction as normal service flow. This fluffing cycle is useful in any SMI reactor column removing metals or other substances from water, not limited to coal mine runoff. As an alternative the SMI medium can be as a continuous moving medium, as discussed further below.

The process of the invention encompasses water from deep coal mines as well as surface mines. Acid mine drainage water can be extracted from deep mine pools far beneath the surface, where reclamation has covered all traces of the mine at the surface. In addition, the process can be applied to gob piles or refuse piles from deep coal mines, some of which include millions of cubic yards of rocks, clay and other refuse separated from coal brought out of the mines, and these refuse piles contain REEs.

It is an object of the invention to provide a process and system which effectively and efficiently extract REEs from water, particularly acidic water at, for example, a coal mining site. This can be as a byproduct of a process to remediate contaminants from the water or from refuse or ash piles, or as a primary product. Other objects and advantages of the invention will be apparent from the following description of preferred embodiments, considered along with the accompanying drawings.

DESCRIPTION OF PREFERRED EMBODIMENTS

Permits for surface mine operators in the U.S. require that the rainfall runoff drainage from the surface mine site be controlled so that no runoff sediment is carried down into creeks, streams or lakes. The rainwater runoff flowing into these ponds from coal mines has aggressively pulled dissolved minerals out of coal and rocks, minerals such as sulfates (e.g. sodium sulfate and magnesium sulfate) and selenium, typically in the selenate form, these minerals being highly soluble. The runoff ponds tend to concentrate the dissolved minerals even further due to evaporation from the ponds. The selenate is difficult to remove from an aqueous solution. Incidentally, the runoff water typically also contains rare earth elements (REEs), i.e. rare earth metals, which are not deleterious to health or environment and occur usually in parts per billion in the water. This is particularly true of acid mine drainage water, and also gob piles and refuse piles from deep coal mining and leachate water from those piles.

Figure 1:
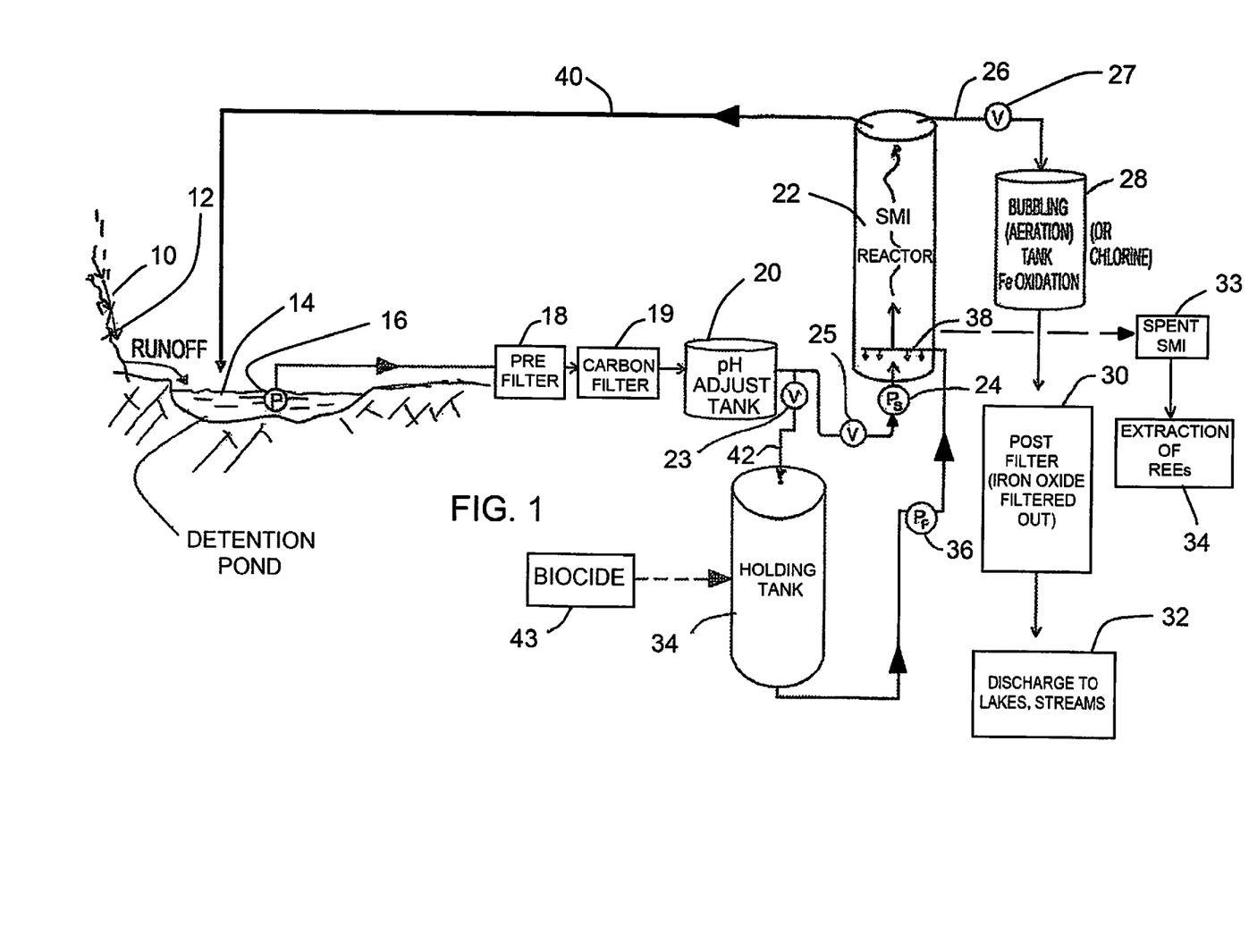
FIG. 1 is a schematic view indicating steps of the invention, including collecting runoff from surface mining coal overburden in a pond, withdrawing the pond water and processing the water through the steps of the invention.

FIG. 1 schematically shows aspects of the invention in the context of a surface mining operation, such as a coal mine, although the illustrated system and process are effective with other contaminant and REE-containing water, particularly derived from deep mining operations. Runoff water emanating from rainfall is indicated at 10, flowing over and through the overburden 12 from a surface coal mining operation, sometimes called strip mining. This overburden is replaced after completion of mining at a particular location, and although the land is reclaimed, and the topography essentially restored using the overburden soil and rocks, this material has nonetheless been disturbed, and runoff rainwater, essentially pure and without dissolved minerals, will actively leach out many of the minerals from the rocks of the overburden. This occurs both during mining and after reclamation. Some of the water often has been in contact with coal, also containing many minerals including REEs.

As noted above and in the above-referenced patents of the applicant, one particularly deleterious mineral typically leached from rocks in certain geographical areas is selenium, usually in the form of selenate. Examples are sodium selenate, calcium selenate and magnesium selenate. The selenate ion is $SeO_4^{2-}$.

Although selenium is a mineral needed in the diet of humans in very small quantities, it has toxic effects to aquatic life at higher concentrations. Certain standards for discharge of runoff water from disturbed or reclaimed land place a limit of five parts per billion (ppb) selenium content for water that will be allowed to flow into streams and lakes. This is imposed whenever human activity is responsible for concentrating the level of selenium. In contrast, runoff water which concentrates in runoff-catching ponds at a surface mining coal site can have twenty to thirty parts per billion selenium and occasionally more.

Similarly, REEs present in the leaching water or other mine waters are at relatively high concentrations. See the article "Overview of Rare Earth Element Investigations in Acid Waters of U.S. Geological Survey Abandoned Mine Lands Watersheds" (Philip L. Verplanck, D. Kirk Nordstrom and Howard E. Taylor, U.S. Geological Survey, Boulder, Colo., January 1999).

FIG. 1 indicates one such runoff-catching pond, at 14. By the process and system of the invention, the runoff pond water 14 is remediated to remove much of the selenium content, down to below the limit of 5 ppb, and the SMI process can bring the selenium content down to below detectable levels. As indicated, the runoff water is pumped by a pump 16 from the pond (preferably a submerged pump suspended just below the surface), and prefiltered at 18 to remove suspended and colloidal solids. This can be, e.g., a sand filter. Following this filtration the water optionally can be put through a carbon filter as indicated at 19 to remove any additional colloidal matter and any color left in the water.

The acidity of the filtered water is checked (and preferably is constantly monitored) at a tank 20, and if needed, pH is adjusted in this tank, which can be on a continuous-flow basis. An automatic system that monitors pH of the pond water and automatically adds acid for pH correction may be included in the tank or chamber 20. The preferred range of pH for treatment in the invented process is below pH 7, and preferably in the range of about 4.0 to about 6.5, more preferably about 4.0 to about 5.5, particularly for REE removal. Preferably pH is not below about 4.0. At a pH greater than about 7 or 8, calcium can be precipitated during the treatment, which has a negative effect on treatment. If the water is too acidic the iron in the SMI could be attacked. In one preferred embodiment the acidity of the water exiting the adjustment tank or zone 20 is about pH 6 for optimum selenium removal, although preferably lower for REE removal. This may require addition of acid (sulfuric acid in a preferred embodiment) in the tank or zone 20, since the runoff water at a location such as the Appalachian Mountains is typically in the range of about pH 7 to 7.5, although acid mine water is often much more acidic. Since the chemical reactions taking place in the SMI reactor tend to increase the pH to above 8.0, the acid addition is required to avoid impairing the life of the SMI. If the water is too acidic a base can be added, such as $C_aCO_3$. For REE recovery, as noted below, the preferred pH range may be about 4 to 5.5, or 4 to 6.5.

The prefiltered runoff water, at a pH in the desired range, proceeds to a reactor column 22, which may involve another pump (after flow through a valve 25, the purpose of which will be explained below). The column 22 comprises a vertical reactor vessel through which the water is pumped to flow preferably from bottom to top as indicated; upflow assures proper and even contact with the reactant and helps keep the mass of reactant particles "open" rather than compacted. The vessel is filled with sulfur-modified iron or SMI as noted above, the SMI being chemically reactive to remove selenate and some other materials from water by adsorption, as discussed in the patents cited above, incorporated herein by reference. The depth of SMI in the reactor vessel should be limited, preferably no more than about six feet high (and preferably lower), to avoid compaction of the SMI particles. Openness is needed for best contact and treatment. In a reactor column having a diameter of about 2.0 feet and a SMI bed depth of about 40 inches, the water will take about eight minutes to flow through the SMI bed (and additional time to exit at the top of the vessel). This is a preferred dwell time for contact with the SMI, or preferably a range of about 3 to 15 or 3 to 10 minutes empty bed contact time, usually 8 minutes being sufficient. The water flows out through a line 26 and a valve 27, explained below.

In a practical installation, a reactor vessel should have an inside diameter in a range of about 3 to 6 feet.

In the effluent of the reactor, indicated at the top of the reactor at 26, the treated water is low in selenium, below permissible limits, and will contain some residual calcium, magnesium and other minerals that may be picked up via leaching, but the water also carries some additional dissolved iron taken on from the SMI.

Iron can be removed from the treated effluent using oxidation and filtration. For example, in a tank 28, the treated water can be subjected to bubbling aeration to oxidize iron in the water, creating an iron oxide precipitate. Oxidation can also be effected by chlorination in a tank such as shown at 28. FIG. 1 shows a post-filtration step 30, in which iron oxide precipitate is filtered out of the treated water, which can be with another sand filter or another type of filter. The iron content is reduced preferably to below 0.5 parts per million. As indicated in the drawing at 32, the treated water after the sand filter can then be discharged to lakes or streams.

The entire process of the invention can be, and preferably is, carried out at atmospheric pressure (disregarding slight hydraulic pressure from pumping and in the reactor column).

As noted above, while removing deleterious substances from the water, the process of the invention also removes and produces rare earth metals as an important, valuable by-product. The SMI when spent is subjected to separation processes to extract the REEs. The spent SMI normally will be removed from the column then processed to accomplish the REE extraction and recovery, as indicated in the blocks 33 and 34. Methods for such processing are known to skilled persons in the chemistry field and can involve heat and/or solvent extraction. See, for example, for a discussion of extraction processes, the article wvutoday.wvu.edu/stories/2018/07/18/wvu-opens-new-research-facility-to-extract-valuable-rare-earths-from-acid-mine-drainage.

As mentioned above, periodically the reactor column, i.e. the contact bed within the reactor 22, is subjected to "fluffing" to loosen and open the bed to prevent or break up compacting that has occurred, to extend the life of the medium. In FIG. 1 a separate flow circuit or fluff loop is indicated for this purpose, with the valve 23, a line 42, a holding tank 34, a fluff pump 36, fluff nozzles 38 in the tank 22, and a fluff return line 40. Fluffing of the reactor contact bed is performed preferably at least once daily, for about ten to twenty minutes. For a fluff cycle the tank 34 is pre-filled. The valve 23, which receives the prefiltered, pH-adjusted pond water, is opened to allow water to flow through the line 42 to the holding tank, which is vented to allow filling. Note that the line 42 could come from farther upstream, but preferably is as shown, so that filtered water at desired acidity is used for fluffing the SMI. When a fluff cycle is begun the pump 24 and the valves 25 and 27 are shut off and the fluff pump 36 is activated, drawing water out of the already-filled holding tank 34 and delivering the water at high velocity, approximately ten times or more service flow rate, through the fluff nozzles 38 in the tank. This rapid flow, preferably directed downwardly as it exits the nozzles 38, stirs up, fluffs, expands and fluidizes the SMI reactor bed, normally expanding the bed to twice its normal volume in the tank. With the service flow exit valve 27 closed, fluff water exits the tank at 40 and can be returned to the pond water 14. This water could be directed in a different way if desired, such as to the holding tank 34, although the water, still with high selenium, would also carry an elevated iron content from contact with the medium and thus return of the water to the runoff pond is generally preferable.

During the fluff cycle the valve 23 can remain open, slowly admitting water into the holding tank 34 while this tank is essentially drained by the fluff pump 36. The holding tank provides storage for the surge of fluff water flow that occurs during the fluff cycle. Note that the tank 34 is vented.

At the end of a fluff cycle, the valve 27 is opened, the valve 25 is opened to deliver service water flow via the pump 24, which is reactivated, and the fluff pump 36 is shut off. However, the holding tank 34 must be refilled, which can be done simultaneously with normal service flow through the reactor, and the valve 23 remains open (or is reopened if it has been closed during fluff). FIG. 1 is a simplified view, and in many instances there will be a plurality of reactors 22, e.g. ten or more, operating in parallel. The valve 25 is a schematic indication, and typically the pump 24 will provide service flow to a series of reactor vessels, e.g. ten or more, or each vessel can have its own service pump. The fluff flow is a much higher rate of flow, thus the need for the holding tank 34. The tank 34 can be open at top or otherwise vented so that it can be essentially drained during fluff. It can then be refilled at a slower rate, from the water flow downstream of the pH adjustment tank. Normally one reactor tank 22 is fluffed at a time.

Figures 3, 3A:
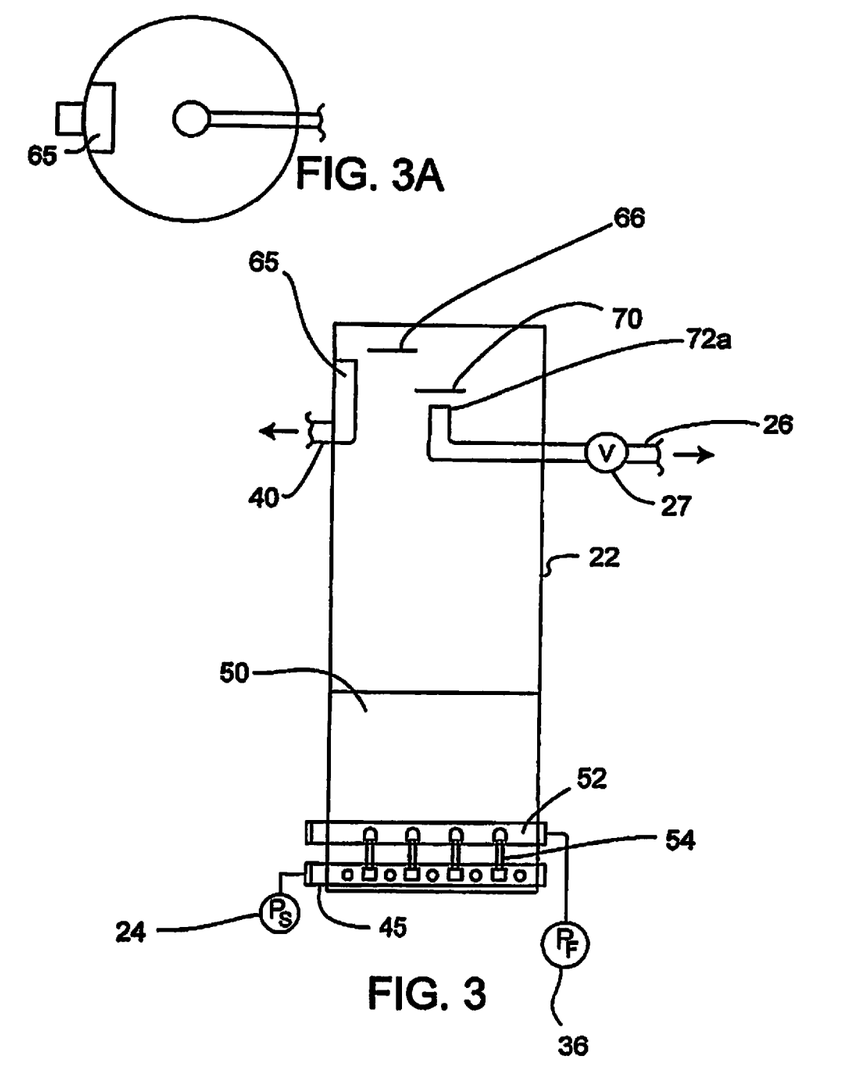
FIG. 3 is a more detailed schematic elevation view of the reactor vessel of the system.
FIG. 3A is a schematic plan view showing elements of the reactor vessel.
Figure 4:
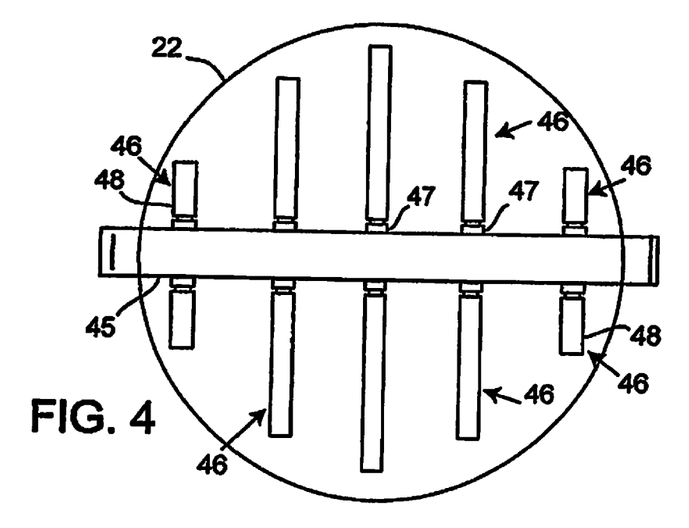
FIG. 4 is a plan view showing a layout of service flow diffusers in the reactor vessel.

The reactor 22 is shown in greater detail in FIGS. 3 and 3A, where the schematic views essentially show the reactor vessel in cross section, both elevation and top plan. FIG. 3 shows the service pump 24, also designed as $P_s$, directing the prefiltered and pH-adjusted pond water into the bottom of the tank via a header or manifold pipe 45 at the tank bottom. The header 45, preferably a stainless steel pipe of about 4 inch diameter, is shown in FIG. 4 as feeding a series of diffuser tubes 46 of various lengths in accordance with the circular shape of the reactor as indicated at 22. Couplings 47 secure the tubes 46 to the header. These diffusers evenly disperse the pond water around the area of the reactor. The diffuser tubes preferably are stainless steel pipe, e.g. ¾ inch 316 stainless steel pipe, although they could be epoxy coated carbon steel. These pipes are plugged at the ends and have diffuser holes, which may be about 1/8 inch diameter, essentially equally spaced on the diffuser pipes and numbering about 68 (about 60 to 75) in a reactor tank having an outside diameter of 44 inches, inside diameter slightly less (about 43½ inches). A range of diameter for practical purposes is about 3 feet to 6 feet. These pipes preferably are each encapsulated with a cylindrical screen 48 as indicated in FIG. 4. The screens help diffuse the pond water more evenly within the tank, and they prevent the reactor medium from clogging the delivery holes of the pipe. The screens are advantageously made of wedge wire, triangular in cross section, with slots facing inwardly toward the diffuser pipe. The screen slots may be about 0.005 inch wide, with the diffuser screen cylinder being approximately 2_inch O.D. For example, these stainless steel screens may be made of wedge wire such as made by Johnson Screens (johnson-screens.com) and often used in water wells. The screens have their slits facing inwardly.

Figure 2:
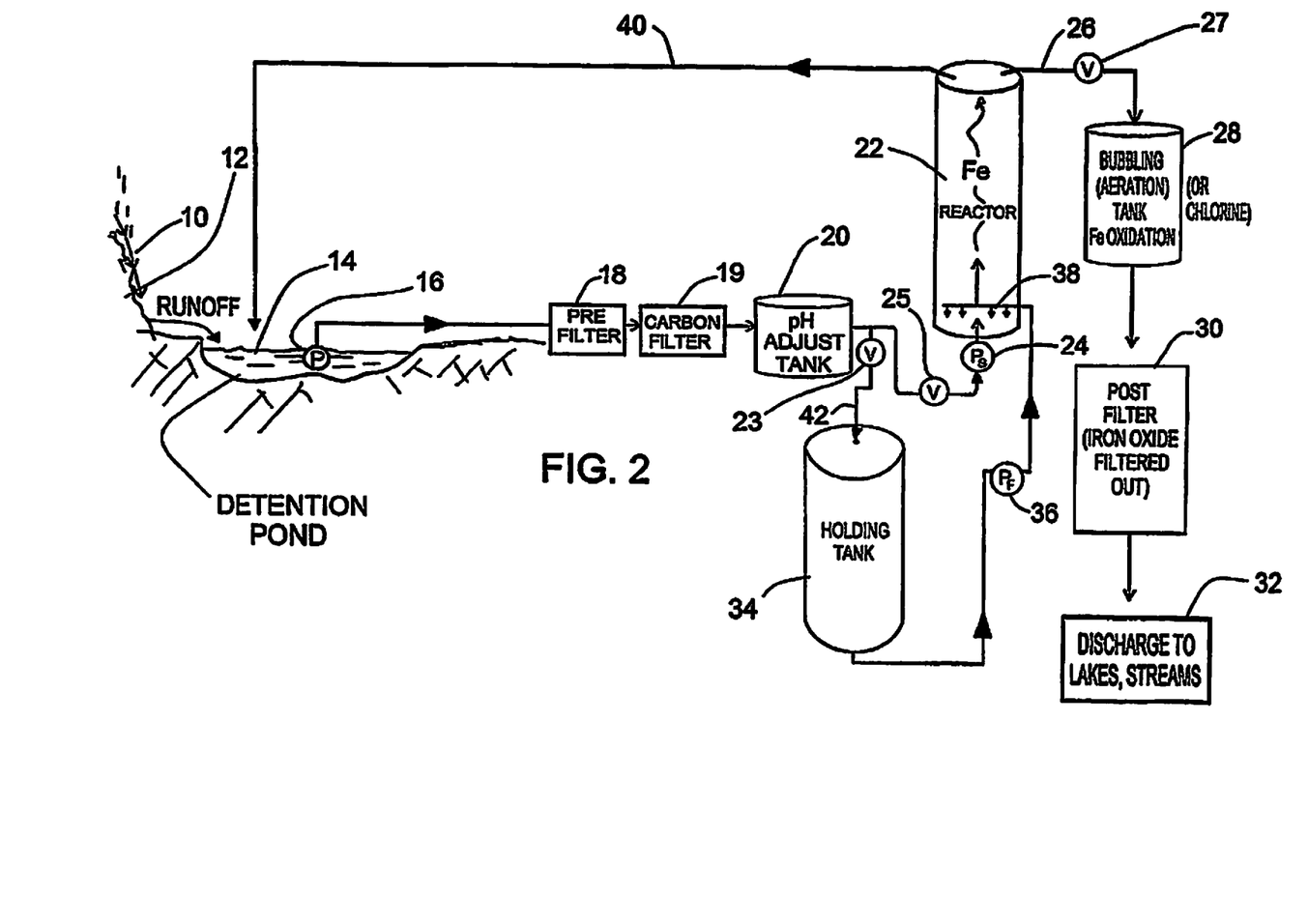
FIG. 2 is a similar view but showing a modified process.

FIG. 2 illustrates a process and system similar to FIG. 1, but using zero valent iron (ZVI) in place of SMI in the reactor column 22. Extraction of contaminants or other materials, including REEs, can be achieved using ZVI but at far lower rate and efficiency as compared to SMI, possibly 5% to 30% the efficiency of SMI.

FIG. 3 indicates the reactor medium 50 in the tank 22, the medium extending through less than half the height of the tank, and typically only about 1/3 the height of the tank. Also shown in FIG. 3 is the fluff pump 36, feeding high-velocity fluff water to the tank via a header 52 spaced above the service header 45. As explained above, the fluff pump 36 is active when the service pump 24 is inactive, and vice versa. The fluff header 52 is spaced a short distance above the header 45, e.g. about 4 inches, with short drop pipes 54 that extend down to deliver fluff water at approximately the same level as the service delivery pipes, i.e. as close to the bottom of the reactor vessel as practicable.

Figure 6:
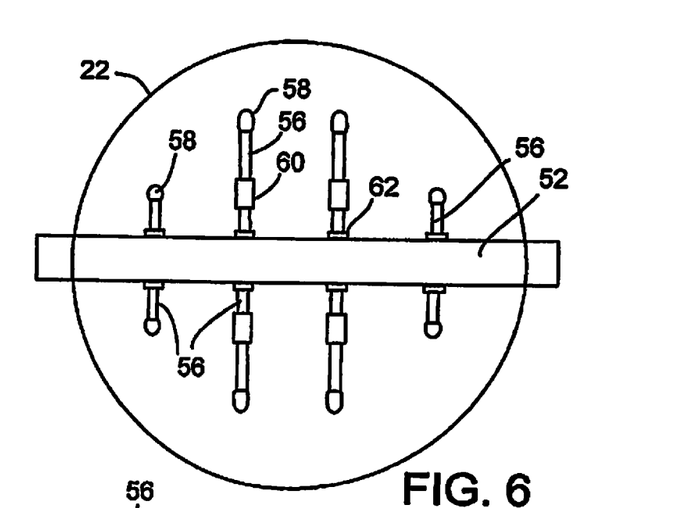
FIG. 6 is a plan view showing a layout of fluff flow nozzles.

FIG. 6 shows one preferred layout for the fluff water delivery system. The fluff header 52 can be a 4 inch pipe, to which are secured a series of laterals 56, with lengths that vary in accordance with the circular layout, as shown. There may be fewer of these than in the case of the service flow diffusers, as well as fewer and larger exit orifices, for delivery of the fluff flow which is approximately ten times or more the volumetric flow rate of the service flow.

Figure 5:
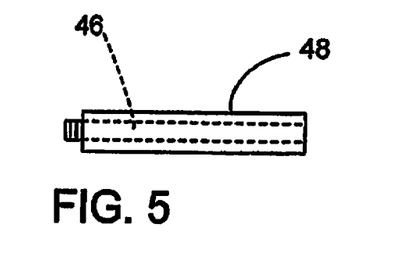
FIG. 5 is a detail view of a service flow diffuser.
Figure 7:
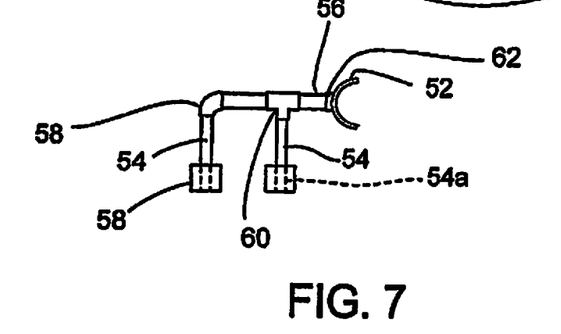
FIG. 7 is a detail view showing fluff nozzles.

As shown in FIGS. 6 and 7, the 4 inch header pipe 52 delivers the fluff flow via the laterals 56 down through the drop pipes 54 to fluff nozzles which, like the service nozzles, preferably are enclosed within cylindrical wedge wire screens 58. The drop pipe ends 54a enclosed within the screen preferably comprise, on each drop pipe, about four holes of about 3/8 inch diameter. Thus, in the layout shown in FIGS. 5 and 6 there are preferably about 48 holes. In a preferred embodiment the laterals 56 are 1½ inch pipe (preferably stainless steel), with the drop pipes preferably 1 inch pipe. Ells 58 and tees 60 are shown connecting the drop pipes to the lateral pipes 56, and these also are preferably stainless steel. Couplings are shown at 62 connecting the laterals to the 4 inch header pipe 52, also preferably of stainless steel. The couplings are welded onto the header.

The drop pipes 54 are of a length to place the high-flow fluff exit nozzles near the bottom of the reactor tank, and this may be in essentially the same level as the service flow diffusers as described above.

The headers 52 and 45 in one preferred embodiment extend through the walls of the reactor tank 22 as indicated in the drawings, and are welded to the walls in sealed relationship.

As noted above, the contact bed 50 of SMI medium is expanded greatly during the fluffing cycle, such that it occupies usually twice or more its normal volume in the tank. During the fluff cycle the fluffing water exits the tank via an overflow weir 65. Water level during fluff is indicated at 66 in FIG. 3, higher than service flow level. The water exits through a pipe 40, preferably a 6 inch pipe, which is the exit line schematically shown in FIG. 1, and this may return the fluff water to the detention pond.

In normal, service flow, the water level will be approximately at the indicated level 70 in FIG. 3, with the water exiting through a pipe 72, which can be a 3 inch pipe. This feeds the exit line 26 indicated in FIGS. 1 and 2, with the valve 27 in this line to be shut off during a fluff cycle. The pipe 72 has an input end 72a at a level high enough in the tank that the medium will not reach this level during a fluff cycle.

Chemical Reactions

As noted above, the SMI acts by absorption/adsorption. What appears to happen is that the selenate ion is pulled apart. The selenium of the selenate ion is believed to combine partly with the sulfur and partly with the iron and iron oxide (and possibly iron hydroxide) of the SMI; both selenium-sulfur and selenium-iron compounds exist in nature, usually together with other mineral elements and oxides. In fact, powdered iron alone (ZVI) has been used in the prior art to remove selenium, but as compared to the process with SMI, the use of powdered iron requires about three to ten times more iron than does the SMI process. Also, many times more iron becomes dissolved in the treated water with the use of powdered iron rather than SMI.

The SMI in a reactor vessel is expected to remain active and effective for a considerable period of time, even one year or more, when the reactor is operated at about 4-5 gallons per minute per square foot SMI. Much shorter periods of time can be used for batches of water. When the SMI has lost most of its effectiveness, it is replaced and the spent SMI can be subjected to known REE recovery techniques and can be melted down to retrieve the iron for re-use.

Examples—Acid Mine Water—REE Recovery

The following examples represent tests conducted on approximately 200 gallons of acid mine water recovered from a pond below an abandoned, shut-in coal mine in northern West Virginia. The water consisted of surface water which was rainwater leached through rock.

A small scale SMI reactor was operated in Madison, W. Va. in June 2020. It consisted of an 8 inch diameter, 7 foot high steel pipe with a flanged bottom and an open top. A 6 inch long, 1½ inch diameter wedge wire pipe was placed inside the pipe at the bottom of the reactor perpendicular to the pipe wall to act as a diffuser for the influent mine water. Sulfur Modified Iron (SMI) was put into the pipe to a depth of 40 inches and water passed upflow through the SMI bed at a rate of 0.6 gallons per minute. The time of contact of water with the bed was approximately 14 minutes and the flow flux was about 2 gallons per minute per square foot.

The raw pond water had an initial pH of 3.5. It was adjusted, for three different tests performed on the 200 gallon sample divided into three portions, to respective pH of 4.28, 4.51 and 5.25. The adjustment was made by adding sodium hydroxide to the water. Note that some mine waters will need acidification, or no adjustment at all, to exhibit a pH in the range of about 4 to 5.5, or more broadly, 4 to 6.5.

Example 1

The SMI process described above was used on a sample of about 65 gallons of acid mine water recovered from the West Virginia mine noted above, as part of the 200 gallons taken from the mine pond.

In this example the acidity of the raw water was adjusted to pH 4.28. This was done by adding NaOH to the raw water, which was originally more acidic, at about pH 3.5.

The pH-adjusted raw water was tested for rare earth elements (REEs), sixteen of which were detected. Metal analysis was by EPA200.8 method and the instrumentation for these elements. Table A shows the content of each of the sixteen REEs in the raw, pH-adjusted water. See the lines labeled "Ex. 1 Raw". The amounts of the REEs are shown in micrograms per liter, i.e. parts per billion. Note that thorium, uranium, sulfate and chlorine are also shown with detected amounts. The same water, after treatment in the SMI column as described above, was tested for the same REEs post-treatment, as shown in the rows labeled "Ex. 1 Post". The table shows very small residual amounts of each of the REEs post-treatment.

Table B shows the same data recompiled so that the REEs are listed in a column at left. Each REE's data is presented in a row, with results of Examples 1, 2, and 3 spread across the table.

As shown in Table B, the total REE content of the raw water, including all of the sixteen REEs, was 685.033 mcg/liter of water. Post-treatment, the residual of REEs collectively was down to 2.460 mcg/liter. This is effectively a 100% recovery of the REEs, collected on the SMI particles.

Examples 2 and 3

The same raw acid mine water was used, approximately 65 gallons of the total sample of about 200 gallons, for each of Examples 2 and 3. In Example 2 the water was adjusted to a pH of 4.51; in Example 3, to 5.25. Again, the raw pH-adjusted water was measured for content of each of the sixteen REEs listed, the amounts in mcg/liter being shown in Table B. The pH has an effect on detection level, thus the differences in values for raw water REE content among the three examples.

The tables show the results of SMI treatment in Examples 1, 2 and 3. Sixteen REEs were detected in the sample water, as well as many other elements noted in the table. The results in all three examples show essentially 100% recovery of total REEs, by comparing the initial tested content of each REE with the post-treatment content. In each of the three examples recovery is greater than 99%, and in most cases greater than 99.5%. Recovery rates for individual REEs ranged from 99.4% to 99.8%. The REEs are reported in mcg/liter, i.e. parts per billion (ppb). Some REEs show a higher recovery at lower pH, some show the opposite. The results are subject to testing accuracy. In general the results of the three examples show extremely effective REE recovery across the range of the three different acidities.

Note that the initial pH for the tests in Examples 1, 2 and 3 were 4.28, 4.51 and 5.25, respectively. The change in pH due to SMI treatment varied in accordance with initial pH. In Example 1 the increase was from pH 4.28 to pH 6.23; in Example 2, from 4.51 to 5.58; and in Example 3 from 5.25 to 5.66.

It is also noted that the SMI withdrew considerable proportions of other metals shown in Table C: aluminum, calcium, cobalt, iron, magnesium, sodium, nickel, silicon and zinc. In the case of iron, the amount of iron actually increased after SMI treatment, since iron from the SMI is picked up in the water. This effect became greater with higher pH, as seen in Examples 2 and 3. Sodium content changed little post-treatment, while calcium and magnesium increased, with the increase being greater at lower pH. The table also shows recovery of thorium, uranium, sulfate and chlorine. Sulfate increased post-treatment at the lower pH, and chlorine increased in all three examples.

The important end result is that nearly 100% of all sixteen REEs present in the raw water was recovered, captured by the SMI.

Any of the REEs, or all of them, can be recovered from the SMI after a period of service of the SMI, which can be when the SMI is essentially saturated and significantly less effective. This can be by well known conventional methods. For example, see the article "Rare Earth Elements Removal Techniques from Water/Wastewater: A Review", published in *Desalination and Water Treatment*, October 2018, describing techniques for withdrawing REEs from waters. In the SMI process the SMI has pulled off other substances around the REEs. The pure elemental REEs stick to the SMI, which is unique in REE recovery.

One method for REE recovery is to first treat the SMI using a strong acid, e.g. HCl. This separates the iron and breaks down the SMI and leaves zero-valent REEs, as well as other recovered metals, back in solution, including at least some of the iron. This is a highly concentrated solution of REEs. With known REE recovery techniques, such as described in the article referenced above, the REEs are economically recovered. The process of the invention essentially creates a new ore, with very high concentrations of REEs. Other recovery techniques for extracting REEs can be used by those skilled in the art to remove REEs from the spent SMI. These include solvent extraction, electrowinning, nanofiltration, ion exchange resins, differential pH, and acid washing, as well as a number of new techniques being developed currently for extracting REEs from solid materials, e.g. rocks.

The process of the invention thus provides a new and efficient method and system for producing rare earth elements, which can be a byproduct of a process for removing deleterious substances from water, e.g. selenium, or which can be a primary product of an SMI process. As noted above, ZVI could be used in place of SMI, but at significantly lower effectiveness and efficiency. The invention encompasses use of ZVI for extracting REEs.

As explained in referenced U.S. Pat. Nos. 9,427,706 and 10,059,613, a continuous moving medium can be used as the reactor vessel, so that fluffing is not required. The descriptions of those patents relating to continuous moving medium are incorporated herein by reference.

Figure 8:
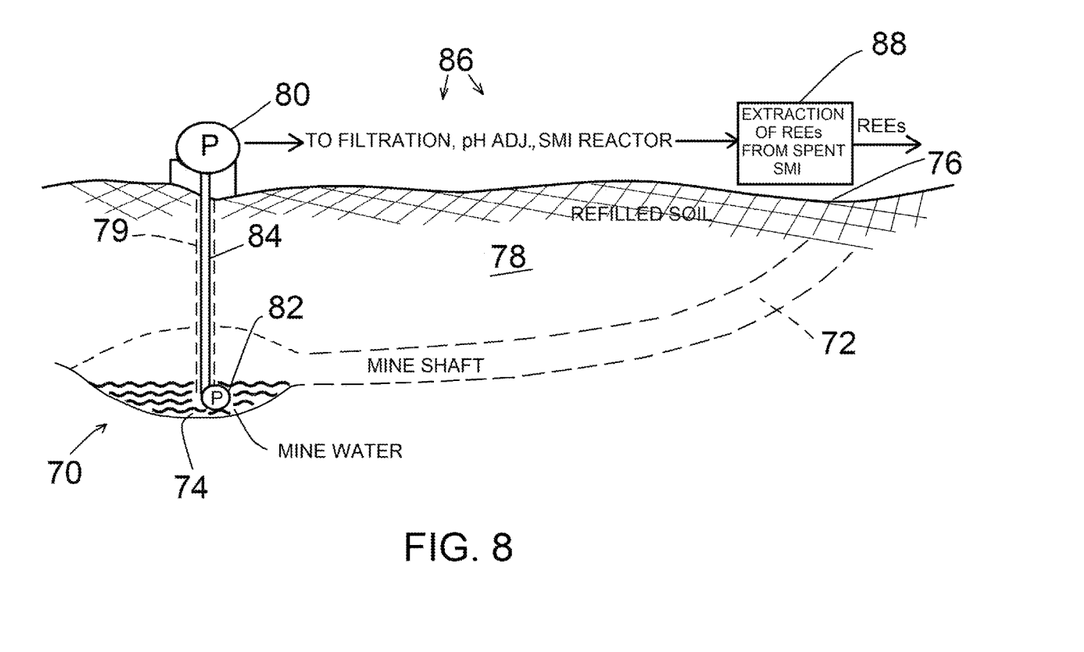
FIG. 8 is a schematic elevation view showing a system and process for recovering REE laden water from a deep mine, such as an abandoned coal mine that has been covered over in reclamation.

FIG. 8 is a schematic drawing indicating a particular aspect of the invention. The drawing represents an abandoned deep mine generally indicated at 70, with a mine shaft 72 previously leading to surface access. A pool of mine water is shown at 74, far beneath the ground surface 76, sometimes hundreds of feet below. What is illustrated is reclaimed land, with refilled soil 78 covering surface access to the abandoned mine, a scenario typical of many closed coal mines.

In these mines there typically is a considerable amount of mine water. The mine water is usually acidic, sometimes quite acidic, and usually will contain some of the rare earth elements. In the procedure and system shown in FIG. 8 a bore 79 has been newly drilled from the surface down to the location of a pool of mine water 74, through the refilled soil, so as to allow for drawing of mine water upwardly for processing according to the principles of the invention. A pump is shown at 80, but nearly always a submerged pump 82 will be required at the lower end of the water withdrawal pipe 84, unless the mine water is at a very shallow location close to the surface.

As indicated in the drawing, mine water is pumped to the surface, then, as noted at 86, the withdrawn mine water passes through processes preferably as shown in FIG. 1 or FIG. 2, with filtration if required, pH adjustment if required, and then entry into the SMI reactor. As noted in the block 88 the spent SMI is removed from the SMI reactor and REEs are extracted from the spent SMI. Similarly they would be extracted from ZVI if that is used as the medium.

The process of the invention applies to other aspects of waters from coal mines. In deep coal mining practices of the 19$^{th}$ century, coal was removed by hand, from coal "seams", which often have clay below the seam and slate or shale just above the seam. With the extraction of coal comes a considerable amount of these other materials, as they are inevitably scraped off along with coal from the seam. The seam itself could be thin, a matter of inches, or several or many feet thick. At the surface the coal is cleaned to remove the waste material. The waste material from such an operation is put into a "gob pile".

In more recent years with coal extracted by machines from the seams, additional material such as clay, shale and/or slate has still been extracted along with the coal, and again this waste material must be separated from the coal, and has been discharged to a pile called a "refuse pile".

The gob piles and the refuse piles typically contain REEs. Many of these gob piles and refuse piles still exist near former or active coal mining operations. The piles are out in the open, and may be vast in size, sometimes over one-half mile in length and 150 to 200 feet high, as in parts of northern West Virginia. Such refuse piles are currently treated in an ongoing program to ameliorate high content of minerals prior to discharge to a river or stream. All deep mining operations have or have had these piles. Pursuant to the invention these gob or refuse piles can be treated by heap leaching, with an acidic water or simply by rainwater, to collect REEs in the leach water.

With some of these vast volumes of refuse, rain falls through, creating a heap leach without the need for additional water. Sometimes the refuse piles have been covered with sheet plastic or other rain-blocking material, which can be removed to allow the water leaching. The leached rainwater will exit the elongated refuse pile at a side and can then be directed to a plant for processing according to the invention.

In surface coal mining, as discussed above, overburden rocks and other materials are above-ground and rainwater will leach through these and pick up many minerals, some deleterious, but also including REEs. This rain runoff often is collected in ponds, also discussed above. In testing with SMI in 2013-2014, the selenium content of such mine pond water was greatly reduced in selenium, using a SMI reactor column as described above. Recently, piles of the spent SMI used in the 2013-2014 testing were located and were tested for REE content. They were found to have significant amounts of many of the REEs. Recovery of REEs from such sources of spent SMI is also an aspect of this invention. Heap leaching with acidic water can be performed to gather the REEs from the SMI into solution.

TABLE A

|  |  |  | Al | Ca | Co | Fe | Mg | Mn | Na |
|---|---|---|---|---|---|---|---|---|---|
| Analyte |  |  | EPA200.7 | EPA200.7 | EPA200.7 | EPA200.7 | EPA200.7 | EPA200.7 | EPA200.7 |
| Method Number |  |  | Rev4.4 1994 | Rev4.4 1994 | Rev4.4 1994 | Rev4.4 1994 | Rev4.4 1994 | Rev4.4 1994 | Rev4.4 1994 |
|  |  |  | mg/L | mg/L | mg/L | mg/L | mg/L | mg/L | mg/L |
| Analysis Date |  |  | Jun. 10, 2020 | Jun. 10, 2020 | Jun. 10, 2020 | Jun. 10, 2020 | Jun. 10, 2020 | Jun. 10, 2020 | Jun. 10, 2020 |
| Method Detection Limit | Matrix | Lab ID | 0.019 | 0.055 | 0.005 | 0.035 | 0.038 | 0.006 | 1.031 |
| 4.24 Raw - Ex. 1 | aqueous | 20'0742 | 34.985 | 99.239 | 0.487 | 1.664 | 53.882 | 13.354 | 22.814 |
| 4.24 Post - Ex. 1 | aqueous | 20'0743 | 0.058 | 119.366 | 0.000 | 5.649 | 117.907 | 2.197 | 21.956 |
| 4.52 Raw - Ex. 2 | aqueous | 20'0744 | 33.758 | 101.561 | 0.490 | 1.649 | 54.823 | 13.288 | 70.616 |
| 4.52 Post - Ex. 2 | aqueous | 20'0745 | 0.048 | 106.836 | <0.035 | 9.376 | 63.240 | 10.430 | 68.859 |
| 5.24 Raw - Ex. 3 | aqueous | 20'0746 | 49.080 | 100.984 | 0.492 | 2.479 | 54.600 | 13.489 | 102.235 |
| 5.24 Post - Ex. 3 | aqueous | 20'0747 | 0.059 | 102.716 | <0.035 | 14.939 | 57.722 | 10.512 | 94.713 |

|  |  |  | Ni | Si | Zn | pH* | Sc | Y |
|---|---|---|---|---|---|---|---|---|
| Analyte |  |  | EPA200.7 | EPA200.7 | EPA200.7 | iM 4500-H+ | EPA200.8 | EPA200.8 |
| Method Number |  |  | Rev4.4 1994 | Rev4.4 1994 | Rev4.4 1994 | 2011 | Rev5.4 1994 | Rev5.4 1994 |
|  |  |  | mg/L | mg/L | mg/L |  | ug/L | ug/L |
| Analysis Date |  |  | Jun. 10, 2020 | Jun. 10, 2020 | Jun. 10, 2020 | Jun. 10, 2020 | Jun. 11, 2020 | Jun. 11, 2020 |
| Method Detection Limit | Matrix | Lab ID | 0.019 | 0.032 | 0.005 |  | 0.037 | 0.004 |
| 4.24 Raw - Ex. 1 | aqueous | 20'0742 | 0.512 | 10.543 | 1.516 | 4.280 | 9.114 | 209.287 |
| 4.24 Post - Ex. 1 | aqueous | 20'0743 | 1.463 | 0.301 | 6.230 |  | 0.070 | 0.245 |
| 4.52 Raw - Ex. 2 | aqueous | 20'0744 | 0.520 | 10.460 | 1.520 | 4.510 | 8.782 | 211.356 |
| 4.52 Post - Ex. 2 | aqueous | 20'0745 | <0.019 | 2.151 | 0.144 | 5.580 | 0.062 | 0.300 |
| 5.24 Raw - Ex. 3 | aqueous | 20'0746 | 0.522 | 10.981 | 1.527 | 5.250 | 12.677 | 235.705 |
| 5.24 Post - Ex. 3 | aqueous | 20'0747 | <0.019 | 2.323 | 0.185 | 5.660 | 0.061 | 0.471 |

|  |  |  | La | Ce | Pr | Nd | Sm | Eu |
|---|---|---|---|---|---|---|---|---|
| Analyte |  |  | EPA200.8 | EPA200.8 | EPA200.8 | EPA200.8 | EPA200.8 | EPA200.8 |
| Method Number |  |  | Rev5.4 1994 | Rev5.4 1994 | Rev5.4 1994 | Rev5.4 1994 | Rev5.4 1994 | Rev5.4 1994 |
|  |  |  | ug/L | ug/L | ug/L | ug/L | ug/L | ug/L |
| Analysis Date |  |  | Jun. 11, 2020 | Jun. 11, 2020 | Jun. 11, 2020 | Jun. 11, 2020 | Jun. 11, 2020 | Jun. 11, 2020 |

TABLE A-continued

| | | | | | | | | |
|---|---|---|---|---|---|---|---|---|
| Method Detection Limit | Matrix | Lab ID | 0.003 | 0.008 | 0.003 | 0.008 | 0.004 | 0.003 |
| 4.24 Raw - Ex. 1 | aqueous | 20'0742 | 41.486 | 109.360 | 21.652 | 114.196 | 32.416 | 8.369 |
| 4.24 Post - Ex. 1 | aqueous | 20'0743 | 0.307 | 0.907 | 0.111 | 0.424 | 0.096 | 0.030 |
| 4.52 Raw - Ex. 2 | aqueous | 20'0744 | 41.226 | 108.711 | 21.659 | 113.098 | 32.993 | 8.411 |
| 4.52 Post - Ex. 2 | aqueous | 20'0745 | 0.180 | 0.601 | 0.077 | 0.337 | 0.078 | 0.028 |
| 5.24 Raw - Ex. 3 | aqueous | 20'0746 | 41.373 | 112.741 | 21.948 | 116.417 | 34.554 | 8.884 |
| 5.24 Post - Ex. 3 | aqueous | 20'0747 | 0.134 | 0.467 | 0.061 | 0.285 | 0.075 | 0.030 |

| | | | Gd | Tb | Dy | Ho | Er | Tm |
|---|---|---|---|---|---|---|---|---|
| Analyte Method Number | | | EPA200.8 Rev5.4 1994 ug/L | EPA200.8 Rev5.4 1994 ug/L | EPA200.8 Rev5.4 1994 ug/L | EPA200.8 Rev5.4 1994 ug/L | EPA200.8 Rev5.4 1994 ug/L | EPA200.8 Rev5.4 1994 ug/L |
| Analysis Date | | | Jun. 11, 2020 | Jun. 11, 2020 | Jun. 11, 2020 | Jun. 11, 2020 | Jun. 11, 2020 | Jun. 11, 2020 |
| Method Detection Limit | Matrix | Lab ID | 0.003 | 0.002 | 0.004 | 0.002 | 0.004 | 0.002 |
| 4.24 Raw - Ex. 1 | aqueous | 20'0742 | 48.704 | 7.167 | 38.914 | 7.372 | 19.130 | 2.373 |
| 4.24 Post - Ex. 1 | aqueous | 20'0743 | 0.095 | 0.017 | 0.063 | 0.014 | 0.034 | 0.012 |
| 4.52 Raw - Ex. 2 | aqueous | 20'0744 | 49.274 | 7.190 | 39.117 | 7.373 | 19.193 | 2.397 |
| 4.52 Post - Ex. 2 | aqueous | 20'0745 | 0.097 | 0.015 | 0.068 | 0.014 | 0.035 | 0.010 |
| 5.24 Raw - Ex. 3 | aqueous | 20'0746 | 51.905 | 7.793 | 42.843 | 8.065 | 21.202 | 2.712 |
| 5.24 Post - Ex. 3 | aqueous | 20'0747 | 0.113 | 0.017 | 0.090 | 0.019 | 0.051 | 0.009 |

| | | | Yb | Lu | Th | U | SO4 | Cl |
|---|---|---|---|---|---|---|---|---|
| Analyte Method Number | | | EPA200.8 Rev5.4 1994 ug/L | EPA200.8 Rev5.4 1994 ug/L | EPA200.8 Rev5.4 1994 ug/L | EPA200.8 Rev5.4 1994 ug/L | SM 4500SO4 2,011.00 mg/L | SM 4500Cl 2,011.00 mg/L |
| Analysis Date | | | Jun. 11, 2020 | Jun. 11, 2020 | Jun. 11, 2020 | Jun. 11, 2020 | Jun. 11, 2020 | Jun. 11, 2020 |
| Method Detection Limit | Matrix | Lab ID | 0.004 | 0.002 | 0.007 | 0.002 | 3.150 | 0.440 |
| 4.24 Raw - Ex. 1 | aqueous | 20'0742 | 13.486 | 2.007 | 1.334 | 5.203 | 679.111 | 2.072 |
| 4.24 Post - Ex. 1 | aqueous | 20'0743 | 0.024 | 0.011 | 0.091 | 0.042 | 693.813 | 3.330 |
| 4.52 Raw - Ex. 2 | aqueous | 20'0744 | 13.470 | 1.970 | 1.300 | 5.509 | 671.411 | 1.434 |
| 4.52 Post - Ex. 2 | aqueous | 20'0745 | 0.027 | 0.008 | 0.077 | 0.022 | 626.313 | 1.682 |
| 5.24 Raw - Ex. 3 | aqueous | 20'0746 | 15.708 | 2.326 | 2.018 | 6.652 | 672.741 | 1.507 |
| 5.24 Post - Ex. 3 | aqueous | 20'0747 | 0.031 | 0.007 | 0.070 | 0.024 | 659.671 | 2.393 |

TABLE B

| | | | Ex. 1 Raw 20'0742 | Ex. 1 Post 20'0743 | Ex. 2 Raw 20'0744 | Ex.2 Post 20'0745 | Ex. 3 Raw 20'0746 | Ex. 3 Post 20'0747 |
|---|---|---|---|---|---|---|---|---|
| Sc | ug/L | Jun. 11, 2020 | 9.114 | 0.070 | 8.782 | 0.062 | 12.677 | 0.061 |
| Y | ug/L | Jun. 11, 2020 | 209.287 | 0.245 | 211.356 | 0.300 | 235.705 | 0.471 |
| La | ug/L | Jun. 11, 2020 | 41.486 | 0.307 | 41.226 | 0.180 | 41.373 | 0.134 |
| Ce | ug/L | Jun. 11, 2020 | 109.360 | 0.907 | 108.711 | 0.601 | 112.741 | 0.467 |
| Pr | ug/L | Jun. 11, 2020 | 21.652 | 0.111 | 21.659 | 0.077 | 21.948 | 0.061 |
| Nd | ug/L | Jun. 11, 2020 | 114.196 | 0.424 | 113.098 | 0.337 | 116.417 | 0.285 |
| Sm | ug/L | Jun. 11, 2020 | 32.416 | 0.096 | 32.993 | 0.078 | 34.554 | 0.075 |
| Eu | ug/L | Jun. 11, 2020 | 8.369 | 0.030 | 8.411 | 0.028 | 8.884 | 0.030 |
| Gd | ug/L | Jun. 11, 2020 | 48.704 | 0.095 | 49.274 | 0.097 | 51.905 | 0.113 |
| Tb | ug/L | Jun. 11, 2020 | 7.167 | 0.017 | 7.190 | 0.015 | 7.793 | 0.017 |
| Dy | ug/L | Jun. 11, 2020 | 38.914 | 0.063 | 39.117 | 0.068 | 42.843 | 0.090 |
| Ho | ug/L | Jun. 11, 2020 | 7.372 | 0.014 | 7.373 | 0.014 | 8.065 | 0.019 |
| Er | ug/L | Jun. 11, 2020 | 19.130 | 0.034 | 19.193 | 0.035 | 21.202 | 0.051 |
| Tm | ug/L | Jun. 11, 2020 | 2.373 | 0.012 | 2.397 | 0.010 | 2.712 | 0.009 |
| Yb | ug/L | Jun. 11, 2020 | 13.486 | 0.024 | 13.470 | 0.027 | 15.708 | 0.031 |
| Lu | ug/L | Jun. 11, 2020 | 2.007 | 0.011 | 1.970 | 0.008 | 2.326 | 0.007 |
| Total REE | | | 685.033 | 2.460 | 686.220 | 1.937 | 736.853 | 1.921 |
| Recovery % | | | | 100% | | 100% | | 100% |
| Th | ug/L | Jun. 11, 2020 | 1.334 | 0.091 | 1.300 | 0.077 | 2.018 | 0.070 |
| U | ug/L | Jun. 11, 2020 | 5.203 | 0.042 | 5.509 | 0.022 | 6.652 | 0.024 |
| | | | 6.537 | 0.133 | 6.809 | 0.099 | 8.670 | 0.094 |
| | | | | 98% | | 99% | | 99% |
| SO4 | mg/L | Jun. 10, 2020 | 679.111 | 693.813 | 671.411 | 626.313 | 672.741 | 659.671 |

TABLE B-continued

|   |      |              | Ex. 1 Raw 20'0742 | Ex. 1 Post 20'0743 | Ex. 2 Raw 20'0744 | Ex.2 Post 20'0745 | Ex. 3 Raw 20'0746 | Ex. 3 Post 20'0747 |
|---|------|--------------|-------------------|--------------------|-------------------|-------------------|-------------------|--------------------|
| Cl | mg/L | Jun. 10, 2020 | 2.072 | 3.330 | 1.434 | 1.682 | 1.507 | 2.393 |
|   |      |              | 681.183 | 697.143 −2% | 672.845 | 627.995 7% | 674.248 | 662.064 2% |
| pH* |    | Jun. 10, 2020 | 4.280 | 6.230 | 4.510 | 5.580 | 5.250 | 5.660 |

TABLE C

|   |      | Analysis Date | 4.24 Raw aqueous 20'0742 | 4.24 Post aqueous 20'0743 | 4.52 Raw aqueous 20'0744 | 4.52 Post aqueous 20'0745 | 5.24 Raw aqueous 20'0746 | 5.24 Post aqueous 20'0747 |
|---|------|---------------|--------------------------|---------------------------|--------------------------|---------------------------|--------------------------|---------------------------|
| Al | mg/l | Jun. 10, 2020 | 34.985 | 0.058 | 33.758 | 0.048 | 49.080 | 0.059 |
| Co | mg/l | Jun. 10, 2020 | 0.487 | 0.000 | 0.490 | <0.035 | 0.492 | <0.035 |
| Fe | mg/l | Jun. 10, 2020 | 1.664 | 5.649 | 1.649 | 9.376 | 2.479 | 14.939 |
| Mn | mg/l | Jun. 10, 2020 | 13.354 | 2.197 | 13.288 | 10.430 | 13.489 | 10.512 |
| Ni | mg/l | Jun. 10, 2020 | 0.512 | <0.019 | 0.520 | <0.019 | 0.522 | <0.019 |
| Si | mg/l | Jun. 10, 2020 | 10.543 | 1.463 | 10.460 | 2.151 | 10.981 | 2.323 |
| Zn | mg/l | Jun. 10, 2020 | 1.516 | 0.301 | 1.520 | 0.144 | 1.527 | 0.185 |
| Ca | mg/l | Jun. 10, 2020 | 99.239 | 119.366 | 101.561 | 106.836 | 100.984 | 102.716 |
| Mg | mg/l | Jun. 10, 2020 | 53.882 | 117.907 | 54.823 | 63.240 | 54.600 | 57.722 |
| Na | mg/l | Jun. 10, 2020 | 22.814 | 21.956 | 70.616 | 68.859 | 102.235 | 94.713 |
|   |      |               | 63.061 | 9.668 | 61.685 | 22.149 | 78.570 | 28.018 |
| % | recovery |           |        | 64%   |       | 64%   |        | 64%   |

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for recovering rare earth elements (REEs) from a water source containing rare earth elements, comprising:
    collecting acidic raw water from a mine or other water source containing REEs,
    assuring pH of the raw water is within a preselected range, and adjusting pH of the raw water as needed to bring the raw water into the preselected range,
    directing the raw water through a reactor column, in a vessel containing a contact bed of SMI which is contacted by the raw water, thereby removing from the raw water and attaching to the SMI REEs from the raw water, along with additional substances that may be present in the raw water,
    after a period of time in which the raw water passes through the reactor column and the SMI becomes less effective in removing REEs from the raw water, discontinuing directing of the raw water through the contact bed, and
    applying an REE recovery process to the SMI to recover at least some of the REEs.

2. The method of claim 1, wherein the raw water has a dwell time in the contact bed of about 8 minutes.

3. The method of claim 1, wherein the adjusted pH range of the raw water is a range of about pH 4 to pH 5.5.

4. The method of claim 1, further including prefiltering the raw water upstream of the reactor column.

5. The method of claim 1, wherein the REE recovery process includes treating the SMI with a strong acid to remove iron from the SMI, thus breaking down the SMI.

6. The method of claim 1, wherein the raw water is pumped through the reactor column in upflow direction.

7. The method of claim 1, further including periodically expanding and loosening the contact bed of SMI by fluffing the contact bed with a high-velocity upflow of water through the bed.

8. The method of claim 7, whreein wherein the raw water is directed through the reactor column in upflow direction.

9. The method of claim 1, wherein the raw water has a dwell time in the contact bed of about 3-10 minutes.

10. The method of claim 1, wherein the acidic raw water comprises water from a pool in a deep coal mine.

11. The method of claim 1, wherein the acidic raw water comprises leachate from coal refuse or gob piles.

12. The method of claim 1, wherein the acidic raw water comprises leachate from a coal ash pile.

13. The method of claim 1, wherein the acid mine water comprises rainwater leached through disturbed rock at a mine.

14. The method of claim 1, wherein the SMI is removed from the reactor column before applying the recovery process.

15. A method for recovering rare earth elements (REEs) from a water source containing rare earth elements, comprising:
    collecting acidic raw water from a mine or other water source containing REEs,
    assuring pH of the raw water is within a preselected range, and adjusting pH of the raw water as necessary,
    directing the raw water through a reactor column, in a vessel containing a contact bed of zero-valent iron (ZVI) which is contacted by the raw water, thereby removing from the water and attaching to the ZVI REEs from the water, along with additional substances that may be present in the raw water,
    after a period of time in which the raw water passes through the reactor column and the ZVI becomes less effective in removing REEs from the water, discontinuing directing of the raw water through the contact bed, and applying an REE recovery process to the ZVI to recover at least some of the REEs.

16. The method of claim 15, wherein the adjusted pH range of the raw water is a range of about pH 4 to pH 5.5.

17. The method of claim 15, wherein the raw water is pumped through the reactor column in upflow direction.

18. The method of claim 15, wherein the acidic raw water comprises water from a pool in a deep coal mine.

19. The method of claim 15, wherein the acidic raw water comprises leachate from coal refuse or gob piles.

20. The method of claim 15, wherein the acid mine water comprises rainwater leached through disturbed rock at a mine.

* * * * *